(12) United States Patent
Lake

(10) Patent No.: US 6,773,171 B2
(45) Date of Patent: Aug. 10, 2004

(54) OPTOELECTRONIC HOUSINGS AND METHODS OF ASSEMBLING OPTOELECTRONIC PACKAGES

(75) Inventor: Rickie C. Lake, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/341,608

(22) Filed: Jan. 14, 2003

(65) Prior Publication Data

US 2004/0136661 A1 Jul. 15, 2004

(51) Int. Cl.$^7$ .................................................. G02B 6/36
(52) U.S. Cl. .......................... 385/92; 385/88; 385/91; 385/78
(58) Field of Search ................................ 385/58, 76, 78, 385/80, 88–92

(56) References Cited

U.S. PATENT DOCUMENTS

| | | | | |
|---|---|---|---|---|
| 4,186,994 A | * | 2/1980 | Denkin et al. ................ | 385/90 |
| 4,330,171 A | * | 5/1982 | Malsot et al. ................ | 385/80 |
| 4,482,201 A | * | 11/1984 | Dousset ........................ | 385/80 |
| 4,756,592 A | * | 7/1988 | Sasayama et al. ........... | 385/88 |
| 4,787,695 A | * | 11/1988 | Laor ............................. | 385/78 |
| 4,907,852 A | * | 3/1990 | Noba et al. .................. | 385/58 |
| 5,222,170 A | * | 6/1993 | Bargar et al. ................ | 385/88 |
| 5,301,250 A | * | 4/1994 | Cheng ......................... | 385/76 |
| 5,519,799 A | * | 5/1996 | Murakami et al. .......... | 385/78 |
| 5,745,624 A | * | 4/1998 | Chan et al. .................. | 385/91 |
| 6,394,665 B1 | * | 5/2002 | Hayashi ....................... | 385/88 |

OTHER PUBLICATIONS

Four photographs of prior art optoelectronic module housing. No date.

* cited by examiner

*Primary Examiner*—Ellen E. Kim
(74) *Attorney, Agent, or Firm*—Grossman & Flight, LLC

(57) ABSTRACT

Optoelectronic housings and methods of assembling optoelectronic packages are disclosed. An example of such an optoelectronic package includes an optoelectronic module having a substrate, a first optical fiber extending in a first direction from the substrate, and a second optical fiber extending from the substrate in a second direction opposite the first direction. It also includes a body defining a chamber dimensioned to receive the optoelectronic module, and an optical fiber feedthrough fixed to a first side of the body for receiving the first optical fiber. A bore is defined in a second side of the body opposite the first side of the body. The bore is positioned to receive the second optical fiber. A second optical fiber feedthrough is threaded onto the second optical fiber and slid into the bore after the second optical fiber is positioned in the bore. The second feedthrough is then secured to the body.

11 Claims, 5 Drawing Sheets

US 6,773,171 B2

OPTOELECTRONIC HOUSINGS AND METHODS OF ASSEMBLING OPTOELECTRONIC PACKAGES

FIELD OF THE DISCLOSURE

This disclosure relates generally to optoelectronics and, more particularly, to optoelectronic housings and methods of assembling optoelectronic packages.

BACKGROUND

It is known to hermetically seal an optoelectronic module within a metal housing to create an optoelectronic package which may be used, for example, in an optical communication system. Typically, an optoelectronic module includes a semiconductor laser diode mounted on a substrate, one or more lenses to focus the laser light generated by the laser, and one or more optical fibers to carry the focused laser light out of the package. The optical fiber(s) typically include a glass core for carrying the light which is protected by a coating of polymer. The polymer coating is stripped and the core or a section of the core is metallized (i.e., surrounded by solderable metal) to facilitate soldering the fiber in a desired location.

An example prior art housing 10 for an optoelectronic module is shown in FIG. 1. The housing 10 includes a body or can 12 which defines a chamber that is dimensioned to receive an optoelectronic module 14. In the example of FIG. 1, the housing 10 is adapted to receive a module having one optical fiber. To this end, the body 12 of the housing includes a fixed feedthrough 18. The feedthrough 18 is brazed to the metal can 12 such that it cannot be removed. In other words, the body 12 is constructed with the fixed feedthrough, 18 before the optoelectronic module 14 is placed in the chamber. An optoelectronic module 14 assembled outside the housing 10 is then inserted into the housing 10 by threading the optical fibers mounted to the module 14 through the fixed feedthrough 18 from within the chamber.

Another example prior art optoelectronic package 22 is shown in FIG. 2. The prior art package 22 of FIG. 2 includes a housing 24 which, like the housing 10 of FIG. 1 is adapted for use with an optoelectronic module 25. However, the module 22 is designed for use with two optical fibers 26, 28 which extend in opposite directions from one another.

To secure the fibers 26, 28 to the optoelectronic module 25, the outer polymer coating of a section of each of the fibers 26, 28 is stripped away and metallization is applied in the required section of the fiber. The metallized layer is then soldered to secure the fiber 26, 28 to the desired location of the optoelectronic module 25. While the metallized layer renders an optical fiber 26, 28 solderable, a metallized area of an optical fiber 26, 28 has reduced flexibility relative to the non-metallized, polymer coated portions of the fiber. As a result, the metallized areas of the optical fibers 26,28 are more breakable than the non-metallized, polymer coated areas.

Because it is necessary to solder the optical fibers 26, 28 to or adjacent the optoelectronic module 25, the areas of the fibers 26, 28 adjacent the module 25 must be metallized. Since the area of the fiber that is stripped and metallized is much more fragile and susceptible to breakage under bend stresses, the housing 24 of FIG. 2 is extended. As a result, the assembled module 25 can be placed into the housing 24 and the fibers 26, 28 can be threaded through respective ones of first and second fixed feedthroughs 30, 32 (which are brazed on opposite ends of the housing 24) without severely bending the fibers. For example, fiber 26 may be threaded into its feedthrough 32. The module 25 may then be placed at the far end of the enclosure adjacent the enclosure wall. Then, the fiber 28 can be threaded into its feedthrough 30. Once the fibers 26, 28 are threaded, the module 25 must be centered within the enclosure to position the metallizations within their respective feedthroughs 30, 32 for final fiber sealing. The extended housing 24 ensures that sufficient distance exists between the ends of the fibers 26, 28 secured to the module 25 and the respective feedthroughs 30, 32 to eliminate the need to sharply bend the fibers 26, 28 when threading them through the feedthroughs 30, 32 thereby minimizing the bending of the fibers 26, 28 during assembly and, thus, reducing the risk of breakage.

As mentioned above, in addition to its extended length, the prior art housing 24 includes two fixed feedthroughs 30, 32. As shown in FIG. 2, each of the feedthroughs 30, 32 is a cylindrical structure having an end brazed to the body of the housing 24, and a central channel for receiving an optical fiber 26, 28. Each feedthrough 30, 32 also includes a solder holder 36 for receiving solder to hermetically seal the fiber to the housing 24. Each feedthrough 30, 32 also includes an epoxy holder 38 to receive epoxy to secure a furcation tube within the end of the feedthrough. The furcation tubes serve to protect their corresponding fibers 26, 28 against damage.

DETAILED DESCRIPTION

Figure 3:
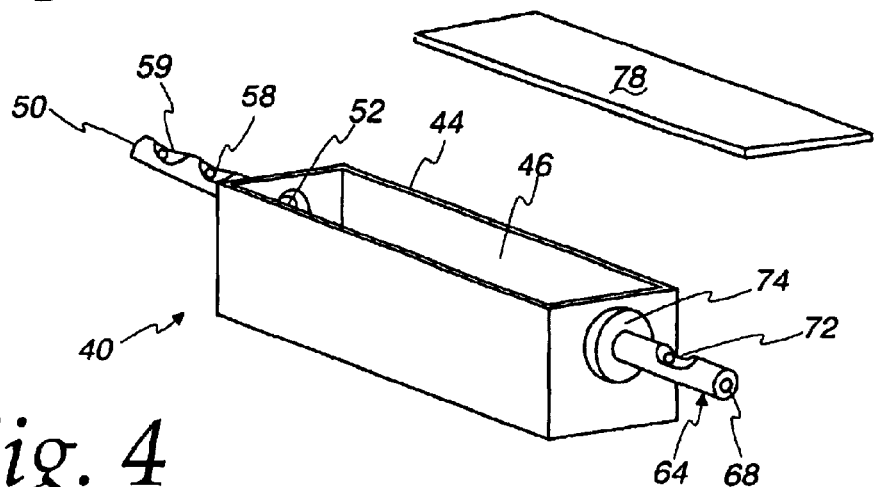
FIG. 3 is a perspective view of an example housing constructed in accordance with the teachings of the invention.
Figure 5:
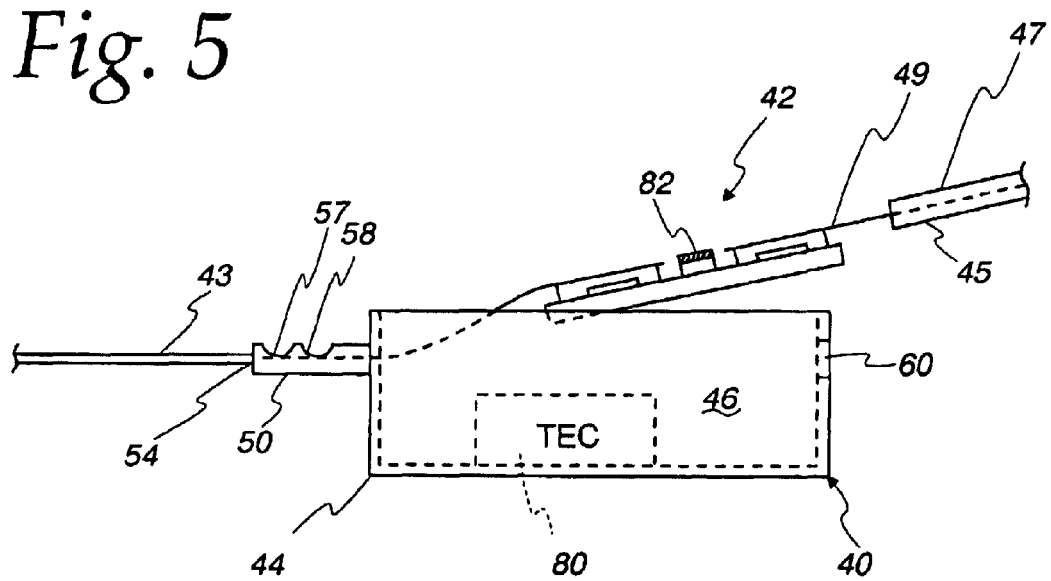
FIG. 5 is a side phantom view of the body of the housing of FIG. 3 shown with one optical fiber of the optoelectronic module inserted into a fixed feedthrough.

FIG. 3 is a perspective view of an example housing 40 for an optoelectronic module 42 having a substrate 41 and two optical fibers 43, 45 extending in opposite directions from the substrate 41 (see, for example, FIG. 5). In the illustrated example, the optical fibers 43, 45 each include an outer polymer coating 47 which may be stripped away to expose one or more sections of the fiber core. The exposed cores section(s) may then be metallized to form one or more metallized sections 49 to facilitate soldering as is conventional.

Figure 1:
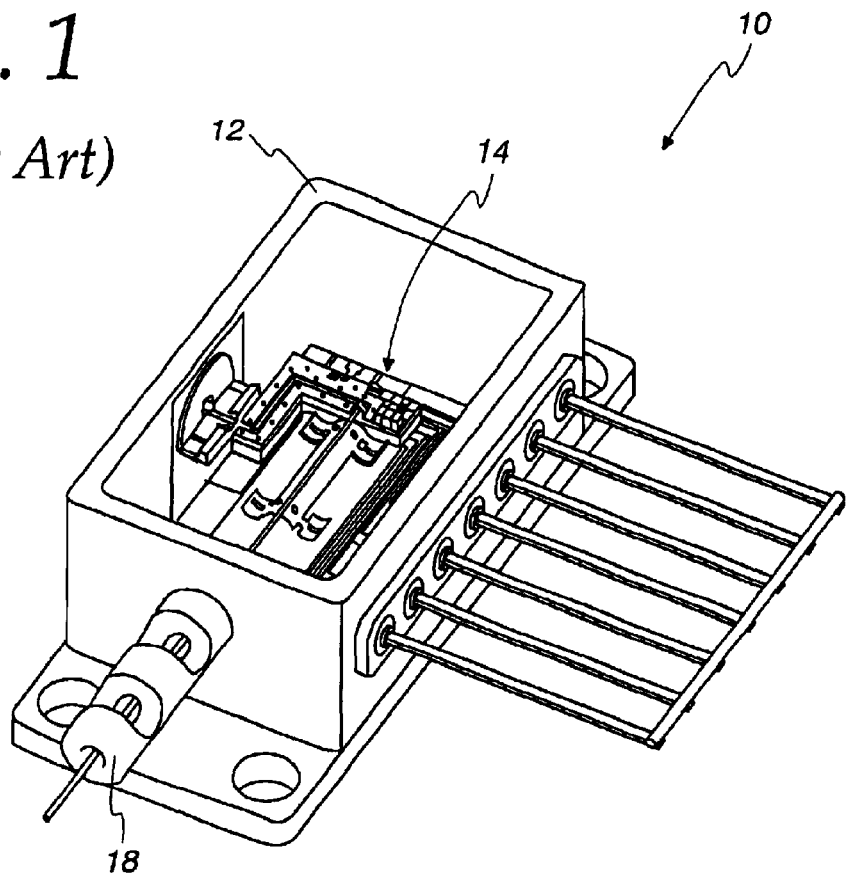
FIG. 1 is a schematic illustration of a prior art housing for an optoelectronic module.

For the purpose of receiving and protecting the optoelectronic module 42, the housing 40 is provided with a body or can 44. The body 44 may be a metal rectangular structure that is plated for soldering as shown in FIG. 3. The body 44 defines a chamber 46 which is dimensioned to receive the optoelectronic module 42. The body 44 and the chamber 46 shown in FIG. 3 are longer than the body and chamber of the prior art housing shown in FIG. 1, and shorter than the body 24 and chamber of the housing shown in FIG. 2. In the example illustrated in FIGS. 3–12, the combined length of the substrate 41, and the two optical fibers 43, 45 exceeds the distance between the opposite ends of the body 44 through which the fibers 43, 45 must pass.

Figure 4:
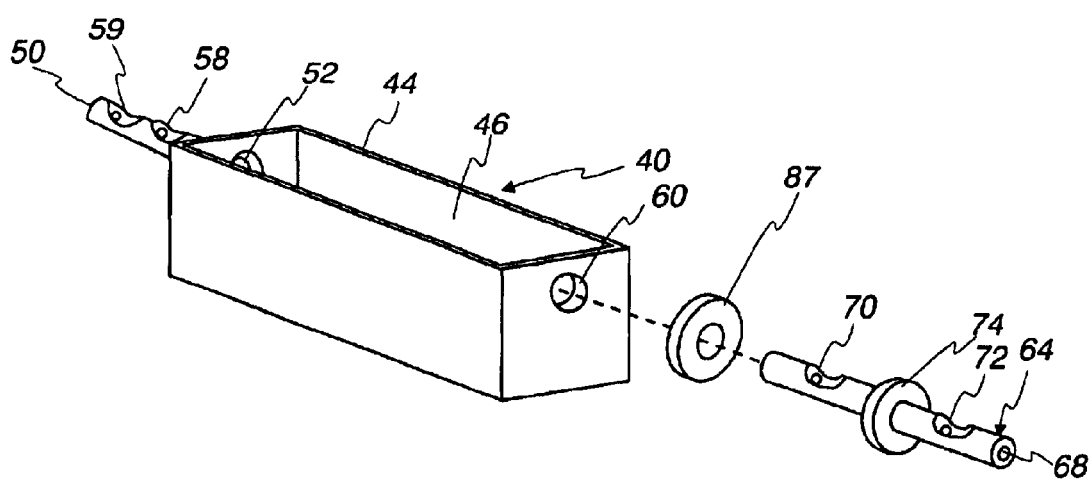
FIG. 4 is an exploded view of the housing of FIG. 3.

In order to provide a channel for threading one of the optical fibers 43 through the body 44, one end of the body 44 is provided with a fixed optical fiber feedthrough 50. The fixed feedthrough 50 shown in FIGS. 3 and 4 is of conventional design. Thus, the fixed feedthrough 50 in this example is a generally cylindrical structure defining a centrally located channel. The channel is dimensioned to threadingly receive one of the optical fibers (e.g., fiber 43) as shown in FIG. 5. Thus, the channel has an open internal end 52 in communication with the chamber 46, and an open external end 54 from which the threaded optical fiber emerges.

Figure 10:
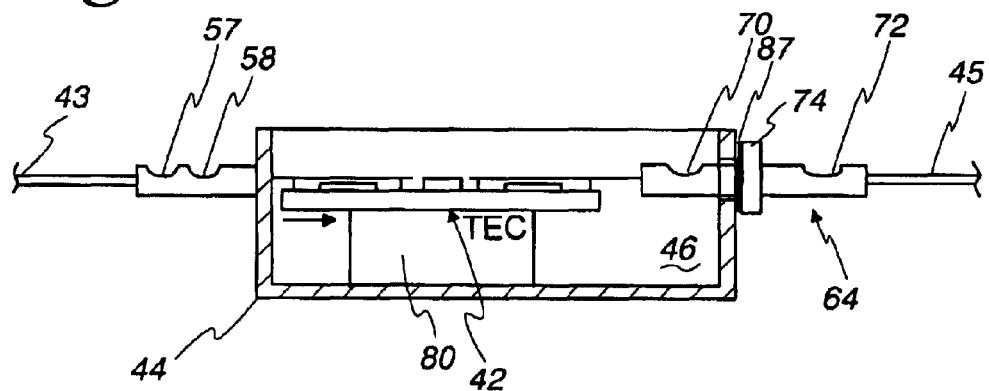
FIG. 10 is a view similar to FIG. 9, but showing the pill being relocated within the chamber of the body.
Figure 11:
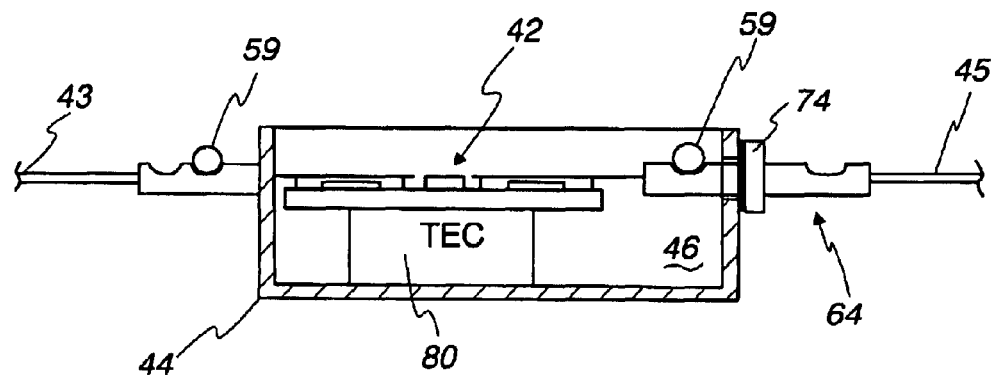
FIG. 11 is a view similar to FIG. 10, but showing solder preforms placed in the solder holders of the first and second feedthroughs.
Figure 12:
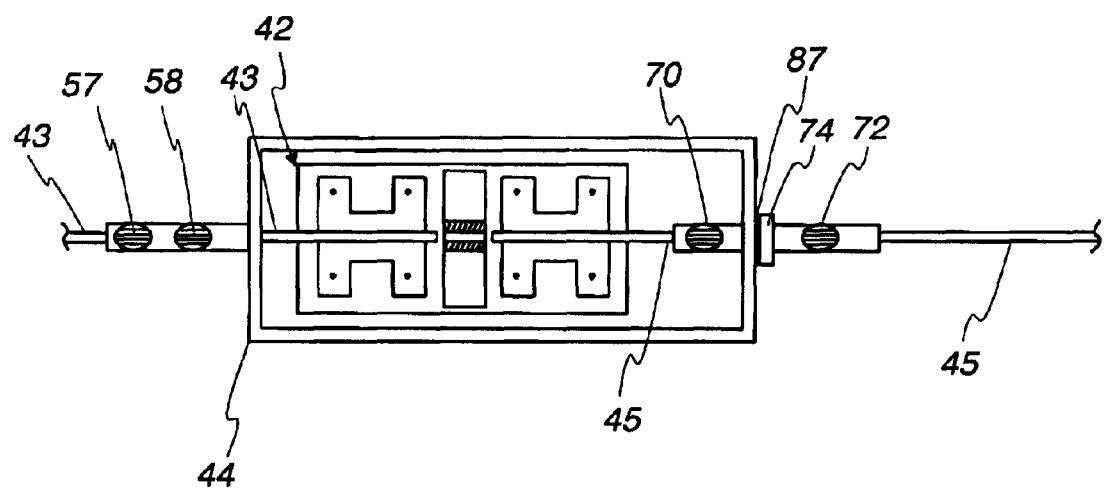
FIG. 12 is a top view of the example optoelectronic package of FIGS. 5–12 shown with the cover removed.

As is conventional, the fixed feedthrough 50 includes a solder holder 58. The solder holder 58 is an aperture formed in an upper surface of the feedthrough 50 as shown in FIGS. 3 and 5. The aperture 58 is in communication with the channel defined through the center of the feedthrough 50. Thus, after the fiber 43 is threaded through the feedthrough as shown in FIG. 10, a solder preform 59 may be inserted into the holder 58 as shown in FIG. 11. When the preform 59 is sufficiently heated with a soldering iron or the like, the solder melts and flows into the channel of the feedthrough 50 to thereby form a hermetic seal around the fiber 43

Figure 2:
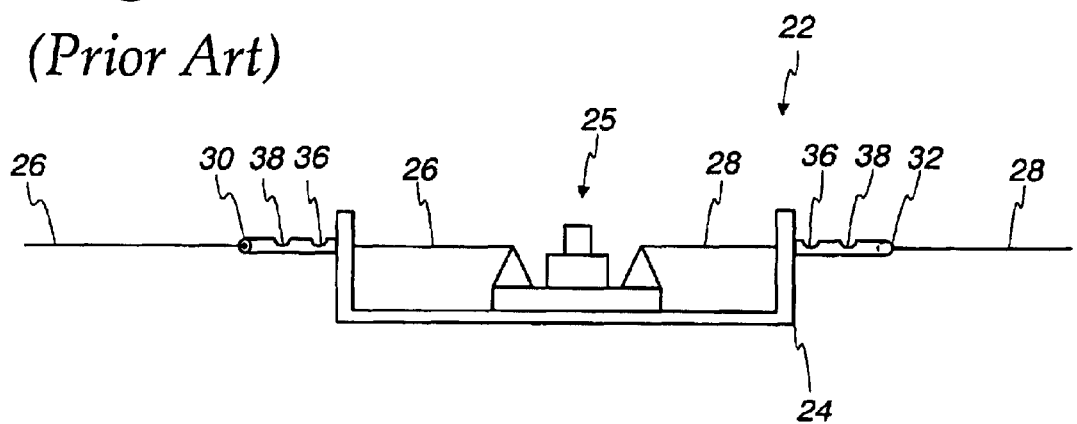
FIG. 2 is a schematic illustration of another prior art optoelectronic module.

In the illustrated example, the fixed feedthrough 50 may also include a sealant holder 57 such as sealant holder 38 shown in FIG. 2. The sealant holder 57 is substantially identical to the solder holder 58, but is located further from the body 44 and functions to receive epoxy or some other sealant. As mentioned above, the sealant functions to secure a furcation tube within the channel of the feedthrough 50 to further protect the fiber 43 against damage and provide an additional layer of sealant to protect the optoelectronic module against environmental influences.

The fixed feedthrough 50 is permanently secured to the body 44 before the optoelectronic module 42 is positioned within the chamber 46 and before the fiber 43 is threaded into the feedthrough 50. The feedthrough 50 can be fixed to the body 44 through any of many well known techniques such as brazing. As shown in FIG. 5, in the illustrated example the first fixed feethrough 50 does not extend into the chamber 46 of the body 44.

Also, although for simplicity of illustration they are not shown in the drawings, the housing 40 includes a plurality of electrical contacts (see, for example, the electrical contacts shown in FIG. 1) that enable a control circuit external to the housing 40 to control the optoelectronic module 42. The electrical contacts and the manner in which they pass through the housing 44 and connect to the module 42 are entirely conventional and, thus, will not be further discussed herein.

Figure 6:
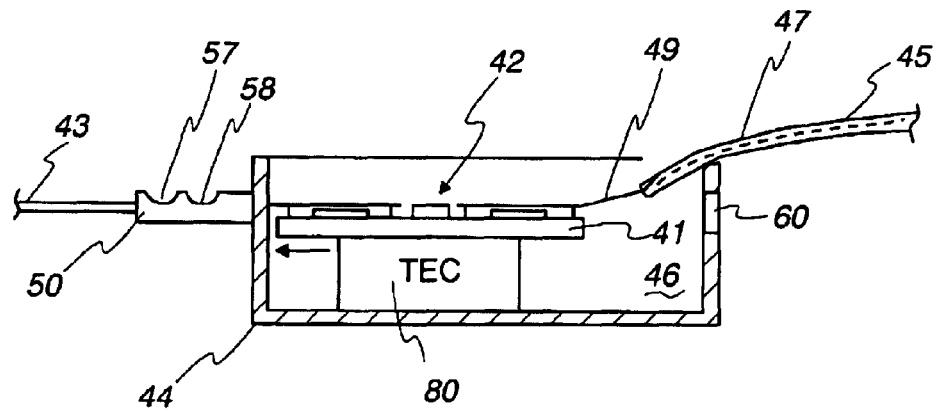
FIG. 6 is a cross-sectional view similar to FIG. 5, but showing the pill inserted into the body.
Figure 7:
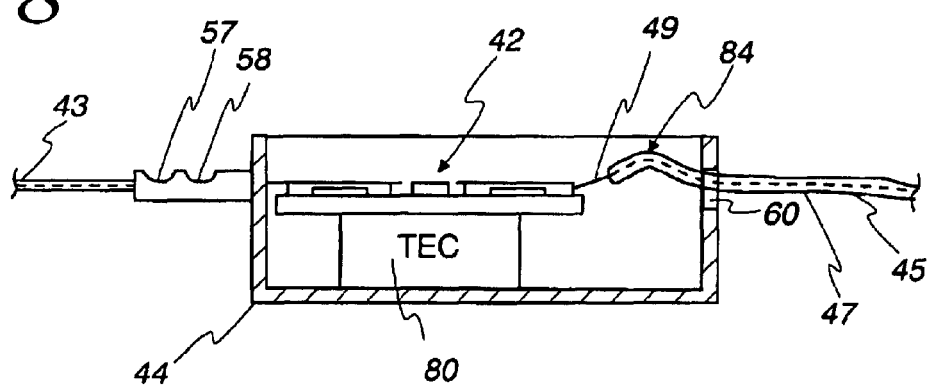
FIG. 7 is a view similar to FIG. 6, but showing the second optical fiber inserted through the bore of the body.

In order to facilitate threading the second fiber 45 of the optoelectronic module 42 through the body 44 of the housing 40 after the first fiber 43 is threaded through the fixed feedthrough 50 and the module 42 is located within the chamber 46, the body 44 defines a large diameter bore 60. The bore 60 is positioned in a side of the body 44 opposite the side where the fixed feedthrough is secured (see FIGS. 4 and 5). The bore 60 has a diameter that is much larger than the outer diameter of the fiber 45 (see FIG. 7) to thereby ease threading of the second fiber 45 through the wall of the housing 44 after the module 42 is placed within the chamber 46. For example, as shown in FIGS. 6 and 7, the module 42 can be placed at one extreme end of the chamber 46 to maximize the distance between the bore 60 and the point at which the fiber 45 is fixed to the module 42. The fiber 45 may then be threaded through the bore 60. Because of the slightly extended length of the body 44 and the large diameter of the bore 60, the fiber 45 can be passed through the bore 60 without severely bending the fiber 45 thereby reducing the likelihood of fiber breakage and, thus, increasing production yield. Also, because the module 42 is temporarily located at a far end of the enclosure 46, the stronger, more flexible, polymer coated section 47 of the fiber 45 is within the enclosure cavity 46 and can, thus, be grasped to strain relieve the point at which the fiber 45 is fixed to the module 42 during the flexing of the fiber 45 needed to complete the threading of the fiber 45 into the bore 60.

Figure 8:
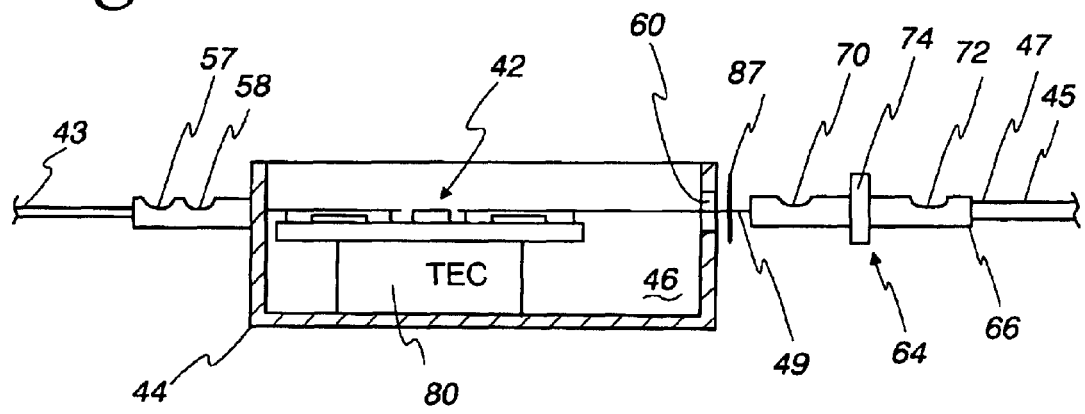
FIG. 8 is a view similar to FIG. 7, but showing the second feedthrough being threaded onto the second optical fiber.
Figure 9:
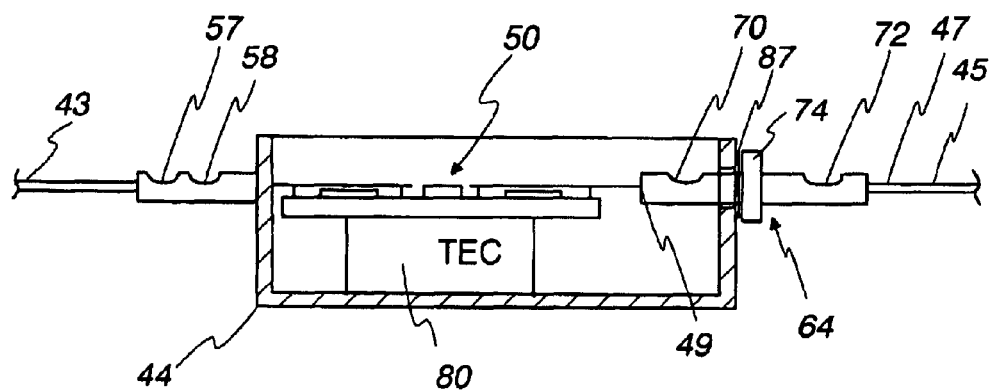
FIG. 9 is a view similar to FIG. 8, but showing the second feedthrough fully inserted into the body of the housing.

The diameter of the bore 60 is selected to matingly engage a second optical fiber feedthrough 64 as shown in FIGS. 4, 8 and 9. The illustrated second feedthrough 64 is dimensioned to be attached (e.g., soldered) to the housing 44 after the optoelectronic module 42 is placed within the chamber 46 after the second fiber 45 is threaded through the bore 60. As most easily seen in FIGS. 4 and 8, the second feedthrough 64 has a generally cylindrical body 66 defining a channel 68 which is dimensioned to receive the optical fiber 45. The channel 68 passes from one end of the feedthrough 64 to the other. A solder holder 70 is formed near one end of the feedthrough 64. A sealant holder 72 is formed at the opposite end of the feedthrough 64. In the illustrated example, the solder holder 70 and the sealant holder 72 are substantially identical and are symetrically located so that either holder 70, 72 could be used as the solder holder or the sealant holder. Thus, the feedthrough 64 does not require a particular end to be inserted into the bore 60 to be operational. Further to this end, the ends of the illustrated feedthrough 64 have substantially the same outer diameter which is selected to fit within the bore 60.

To provide an increased surface to solder or otherwise affix the second feedthrough 64 to the body 44 of the housing 40, the feedthrough 64 is provided with a flange 74. In the illustrated example, the flange 74 has a circular outer perimeter. The diameter of the flange 74 is greater than the diameter of the bore 60 (see FIG. 8). Therefore, the flange 74 provides a limit on the distance that the second feedthrough 64 may be inserted into the bore 60 (see FIG. 9). As shown in FIGS. 4 and 8, the flange 74 is generally centrally located between the opposite ends of the cylindrical feedthrough 64. Therefore, the flange 74 limits the amount that either end of the feedthrough 64 can be inserted into the body 44 to approximately the same distance.

After the second feedthrough 64 is threaded onto the second optical fiber 45 and one of the ends of the feedthrough 64 is passed through the bore 60 and into the chamber 46 a distance sufficient to cause the flange 74 to abut an outer wall of the body 44 adjacent the bore 60, the second feedthrough 64 is fixed (e.g., soldered) to the body 44. In this assembled state (see FIGS. 3 and 9), one end of the feedthrough 64 is located within the chamber 46 and the other end of the feedthrough 64 is positioned exterior to the body 44. The holder 70 or 72 at the end of the feedthrough 64 located within the chamber 46 may be used as the solder holder. Thus, when a solder preform is melted in the solder holder 70, 72, a solder seal is formed within the body 44. This solder seal secures the optical fiber 45 to the feedthrough 64 and provides a hermetic seal. An epoxy seal may also be applied to the second feedthrough via the sealant holder 70, 72 which, as shown in FIG. 9, is located external to the chamber 46.

After the substrate 41 of the optoelectronic module 42 is secured to the interior of the body 44, and the fibers 43, 45 are secured to the housing 40, a cover 78 (see FIG. 4) is secured to the top of the body 44 to complete the hermetic sealing of the chamber 46.

An example method of assembling an optoelectronic package will now be explained in connection with FIGS. 5–12. As shown in FIG. 5, a housing 40 including a body 44 with a fixed feedthrough 50 and a bore 60 is first obtained. A thermoelectric cooler (TEC) 80 may optionally be secured within the chamber 46 of the body 44 to cool the optoelectronic module 42 during use.

The optoelectronic module 42 is assembled externally to the housing 40 in a manner not pertinent to the invention claimed in this patent. The optoelectronic module 42 can be of any design, but typically includes a substrate 41, a laser 82 (see FIG. 5), and two optical fibers 43, 45 secured to opposite sides of the substrate 41 to carry light developed by the laser 82 in opposite directions.

The process of assembling the optoelectronic package is initiated by inserting an end of an optical fiber (e.g., fiber 43) of the module 42 into the chamber 46. The fiber 43 is threaded through the fixed feedthrough 50 via the chamber 46 of the body 44 (see FIG. 5). The fiber 43 is advanced through the feedthrough 50 sufficiently so that the substrate 41 of the optoelectronic module 42 is inserted into the chamber 46. Optionally, the substrate 41 with the assembled optoelectronics (sometimes referred to as a "pill") may be positioned to a far end of the body 44 adjacent the fixed feedthrough 50 as shown in FIG. 6. At this point, the second optical fiber 45 extends out of the top of the chamber (see FIG. 6).

The second optical fiber 45 is then grabbed and threaded through the bore 60 defined in an end of the body 44 opposite the fixed feedthrough 50 (see FIG. 7). It may not be necessary to grab the fiber 45 directly on a metallized portion 49 because of the distance between the module 42 and the bore 60 and the relatively large diameter of the bore 60. An example location for grabbing the fiber 45 is identified by reference numeral 84 in FIG. 7. As shown in FIG. 7, in this example, the grab location 84 is in a polymer coated section 47 immediately adjacent the metallization area 49 of the fiber 45.

After the fiber 45 is threaded through the bore 60, the second fiber feedthrough 64 and the solder perform 87 is threaded onto the free end of the fiber 45 external to the body 44. The feedthrough 64 carrying the perform 87 is advanced along the length of the fiber 45 until the forward end of the feedthrough 64 is inserted into the chamber 46 via the bore 60, and the flange 74 of the feedthrough 64 forces the solder preform 87 (if used) against the exterior wall of the body 44 adjacent the bore 60 (see FIG. 9). The illustrated solder perform 87 is an annular structure. In the example shown in FIG. 8, the solder preform 87 has a circular circumference and a diameter greater than the diameter of the bore 60. Indeed, in the illustrated example, the dimensions of the preform 87 are selected to correspond to the dimensions of the flange 74 of the second fiber feedthrough 64. After the feedthrough 64 and the solder perform 87 are positioned, the flange 74 is secured to the body 44 by, for example, soldering. Because this solder operation is somewhat removed from the optoelecronic module 42, a high temperature (e.g., 280° C. to 360° C.) solder such as Gold Tin may be used as the solder preform 87.

With the feedthrough 64 secured to the body 44, the optoelectronic module 42 may optionally be moved to a more central location in the chamber 46 (see FIG. 10) and the metallized sections 49 of the fibers 43,45 properly positioned in the feedthroughs 50, 64 for solder sealing. The module 42 is then secured to the TEC 80 by, for example, a reflow soldering process using a hot plate and performed without flux. Because of the proximity to the optoelectronics, a low temperature soldering process should be used to secure the module to the TEC 80. For example, Bismuth Tin solder melts at approximately 138° C. and, thus, has been found to be a good choice for this process.

The fibers 43,45 are then sealed using the solder performs 57 as shown in FIG. 11. Because of the proximity to the optoelectronics, a low temperature soldering process should be used to solder the fibers 43, 45 to the feedthroughs 50, 64. For example, Bismuth Tin solder melts at approximately 138° C. and, thus, has been found to be a good choice for this process. As shown in FIG. 11, the solder seal of the fiber 45 to the feedthrough 64 is located inside the chamber 46 which provides enhanced hermiticity.

With the fibers 43, 45 secured to the housing 40 and sealed, a cover 78 is soldered or resistance welded onto the top of the body 44. The enclosure is now hermetically sealed. Epoxy may be inserted into the sealant holder of the feedthrough 50 and the sealant holder 70 or 72 of the feedthrough 64 to secure the furcation tubes (see FIG. 12).

The method of soldering described in U.S. application Ser. No. 10/157,412, filed May 29, 2002 and entitled "Method Of Attaching An Optical Fiber To A Flexure" is currently believed to be the best mode of soldering the feedthrough 64 to the body 44 and to soldering the fibers 43, 45 to their respective feedthroughs 50, 64.

A modified excerpt from that application is attached. Interested readers are, however, referred to that application for a more detailed discussion of the soldering technique. In this example, the technique will be described in connection with securing an optical fiber to a flexure or support.

The soldering technique is a non-contact induction soldering technique. The metallized area 49 of the optical fiber is maintained in direct contact with a pre-tinned solder area of the pre-treated flexure and is ready for soldering. Then, a water-cooled induction coil of an associated induction soldering wand machine (not shown) is placed in position over the engaged assembly of the optical fiber and the flexure. A suitable induction soldering machine is made by Seit Electronics, of Italy, as sold under the Minimax model name, operating at 900 KHZ.

Thereafter, a short induction cycle is triggered by switching on the induction energy source. Depending on the amount of energy utilized and the size and design of the induction coil, a typical cycle of some 5 to 9 seconds can be utilized for the induction soldering method. The induction soldering cycle is approximately seven and one-half (7½) seconds, with an initial four (4) seconds of a pre-gas, e.g. Nitrogen, is directed by local jets onto the solder site (to purge the area of oxygen), then one and one-half (1½) seconds of induction coil heating time is applied, followed by an additional nitrogen gas flow time of two (2) seconds to ensure that the molten solder is protected from oxidation during solidifciation.

Thereafter, the induction energy source is deactivated, and the induction coil is removed. The soldering process is, thus, terminated.

The above technique can be applied to other solders besides the optical fiber/module solder described above. For example, it may be applied to soldering the feedthrough 64 to the body 44 and to soldering the fibers 43, 45 to their respective feedthroughs 50, 64.

From the foregoing, persons of ordinary skill in the art will readily appreciate that improved optoelectronic housings and methods of assembling optoelectronic packages have been provided. The illustrated examples reduce breakage of fibers during package assembly and, thus, result in greater productivity without changing the manner in which the optoelectronic module 42, including the fibs 43, 45, are constructed. Moreover, the illustrated examples achieve these results while using a housing 40 having a smaller footprint than prior art housings for opposed optical fibers.

Although certain example methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For attachment to a housing for an optoelectronic module, a feedthrough comprising:

a cylindrical body defining a channel dimensioned to receive an optical fiber, the cylindrical body having a first end and a second end; and a flange coupled to the body between the first and second ends, the flange being dimensioned to provide a surface for soldering the feedthrough to the housing, wherein the first end includes a solder holder, the second end includes a sealant holder, and the solder holder of the first end is located to be positioned interior to the housing and the sealant holder of the second end is located to be positioned exterior to the housing when the feedthrough is mounted to the housing.

2. A method of assembling an optoelectronic package comprising:

threading a first optical fiber through a first feedthrough via a chamber defined in a housing;

inserting an optoelectronic module coupled to the first optical fiber into the chamber;

threading a second optical fiber coupled to the optoelectronic module through a bore defined in the housing;

threading a second feedthrough onto the second optical fiber;

inserting an end of the second feedthrough into the chamber via the bore; and securing the second feedthrough to the housing.

3. A method as defined in claim 2 further comprising:

securing the first optical fiber to the first feedthrough;

securing the second optical fiber to the second feedthrough; and sealing the housing.

4. A method as defined in claim 2 further comprising:

inserting a furcation tube into the second feedthrough; and fastening the furcation tube to the second feedthrough.

5. A method as defined in claim 2 further comprising threading a solder preform onto the second optical fiber.

6. A method as defined in claim 5 wherein securing the second feedthrough to the housing comprises soldering the solder preform to the housing and the second feedthrough.

7. method as defined in claim 2 further comprising soldering the optoelectronic module to a TEC located within the housing.

8. A method as defined in claim 2 wherein the first feedthrough and the bore are located on opposite sides of the housing.

9. A method of assembling an optoelectronic package comprising:

threading a first optical fiber coupled to an optoelectronic module through a first feedthrough from within a housing; and threading a second optical fiber coupled to the optoelectronic module through a bore defined in the housing before a second optical fiber feedthrough is received in the bore.

10. A method as defined in claim 9 further comprising threading the second feedthrough onto the second optical fiber.

11. A method as defined in claim 10 further comprising inserting the second feedthrough into the bore.

* * * * *